United States Patent
Rácz et al.

(10) Patent No.: US 9,591,515 B2
(45) Date of Patent: Mar. 7, 2017

(54) FEEDBACK-BASED PROFILING FOR TRANSPORT NETWORKS

(75) Inventors: Sándor Rácz, Cegléd (HU); Balázs Gerö, Budapest (HU); János Harmatos, Budapest (HU); Szilveszter Nádas, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/398,762

(22) PCT Filed: May 8, 2012

(86) PCT No.: PCT/EP2012/058461
§ 371 (c)(1),
(2), (4) Date: Dec. 23, 2014

(87) PCT Pub. No.: WO2013/167174
PCT Pub. Date: Nov. 14, 2013

(65) Prior Publication Data
US 2015/0117218 A1     Apr. 30, 2015

(51) Int. Cl.
*H04W 28/02* (2009.01)
*H04L 12/825* (2013.01)
(Continued)

(52) U.S. Cl.
CPC ..... *H04W 28/0257* (2013.01); *H04L 43/0882* (2013.01); *H04L 47/11* (2013.01);
(Continued)

(58) Field of Classification Search
None
See application file for complete search history.

(56) References Cited

U.S. PATENT DOCUMENTS

| 8,917,600 B2 * | 12/2014 | Avila Gonzalez | H04L 12/26 370/235 |
| 9,178,822 B2 * | 11/2015 | Norp | H04L 47/10 |

(Continued)

FOREIGN PATENT DOCUMENTS

| WO | 2011006889 A1 | 1/2011 |
| WO | 2013053404 A1 | 4/2013 |

OTHER PUBLICATIONS

Unknown, Author, "Carrier Ethernet Class of Service—Phase 1", The Metro Ethernet Forum, Implementation Agreement MEF 23, Jun. 10, 2009, 1-41.

(Continued)

*Primary Examiner* — Hong Cho
(74) *Attorney, Agent, or Firm* — Murphy, Bilak & Homiller, PLLC

(57) ABSTRACT

A method is provided of transporting data packets over a telecommunications transport network. The data packets are carried by a plurality of bearers, the bearers each carrying data packets that relate to different ones of a plurality of services. In the method, for each bearer independently of the other bearers, bandwidth profiling is applied to the data packets of the bearer to identify and mark the data packets of each of the bearers that are conformant with a determined maximum information rate for the bearer. The data packets are forwarded for transport through the transport network. If there is insufficient bandwidth available in the transport network to transport all data packets, data packets not identified by the profiling as being conformant are discarded, so as not to be transported through the transport network. The data packets of the bearer transported through the transport network are monitored to determine whether there has been any loss of data packets that should have been transported through the transport network, indicating con- (Continued)

gestion in the transport network. The maximum information rate of the bearer is adjusted based on the monitoring.

18 Claims, 7 Drawing Sheets

(51) Int. Cl.
  *H04L 12/26* (2006.01)
  *H04L 12/801* (2013.01)
  *H04W 28/08* (2009.01)
  *H04L 12/911* (2013.01)
  *H04L 12/813* (2013.01)

(52) U.S. Cl.
  CPC .......... *H04L 47/263* (2013.01); *H04L 47/745* (2013.01); *H04W 28/0236* (2013.01); *H04L 47/20* (2013.01); *H04W 28/085* (2013.01)

(56) References Cited

U.S. PATENT DOCUMENTS

| | | | | |
|---|---|---|---|---|
| 2002/0114305 A1* | 8/2002 | Oyama | .................. | H04L 29/06 370/338 |
| 2002/0181494 A1* | 12/2002 | Rhee | ....................... | H04L 29/06 370/465 |
| 2007/0064608 A1* | 3/2007 | Rinne | ................. | H04L 41/0806 370/230 |
| 2007/0263535 A1* | 11/2007 | Shabtay | .................. | H04L 12/66 370/230 |
| 2010/0195558 A1* | 8/2010 | Koskinen | ............ | H04L 41/5019 370/312 |
| 2010/0254262 A1* | 10/2010 | Kantawala | .............. | H04L 12/56 370/232 |
| 2011/0235528 A1* | 9/2011 | Racz | ....................... | H04L 47/12 370/244 |

OTHER PUBLICATIONS

Unknown, Author, "Carrier Ethernet Class of Service—Phase 2", The Metro Ethernet Forum, Implementation Agreement MEF 23.1, Jan. 2012, 1-102.

Unknown, Author, "Rate adaptation with "MBR>GBR bearers"", 3GPP TSG-SA WG2 Meeting #61, S2-075184, Resubmission of S2-073328, Source: Ericsson, Ljubljana, Slovenia, Nov. 12-16, 2007, 1-5.

Unknown, Author, "SAE QoS Parameters and how they are used in eNodeB", 3GPP TSG SA WG2 Architecture—S2#52, S2-061615, Source: Nortel, Shanghai, China, May 8-12, 2006, 1-10.

Unknown, Author, "Virtual Bridged Local Area Networks, Amendment 4: Provider Bridges", IEEE Standard for Local and metropolitan area networks, IEEE Std 802.1ad™—2005, (Amendment to IEEE Std 802.1Q™—2005), New York, NY, USA, May 26, 2006, 1-74.

* cited by examiner

FEEDBACK-BASED PROFILING FOR TRANSPORT NETWORKS

TECHNICAL FIELD

The present invention relates to improvements in the handling of data communications transmitted across a transport network.

BACKGROUND

A transport network (TN) is used to carry data signals between a Radio Base Station (RBS), such as a NodeB or an eNodeB in 3G Long-Term Evolution (LTE) networks, and a Serving gateway (S-GW) or Packet Data Network gateway (PDN-GW). A TN may be operated by a mobile network operator or by a third party transport provider. In the latter case there would be a Service Level Agreement, SLA, between the mobile and transport operators. With the rapid growth of digital data telecommunications following the introduction of 3G and 4G technology, TNs may frequently act as bottlenecks in the overall data transport process. Thus, various systems and methods have been proposed for improving or prioritising the way that data packets are transported by the bearers.

Service differentiation in the Radio Access Network (RAN) is one supplementary means for more efficiently handling high volumes of traffic. As a simple example, using service differentiation a higher bandwidth share can be provided for a premium service, and in this way the overall system performance can be improved. As another example, a heavy service such as p2p traffic, can be down-prioritized. Implementing such service differentiation methods requires integration into the Quality of Service (QoS) concept of LTE and Universal Mobile Telecommunications System (UMTS) technology. Details of the QoS concept for LTE can be found in the $3^{rd}$ Generation Project Partnership (3GPP) Technical Specification TS 23.410. The main idea of this concept is that services with different requirements use different bearers. When a User Equipment (UE) attaches to the network a default-bearer is established (typically a best-effort service). However, if the UE invokes services having different QoS parameters then a dedicated bearer is established for each service.

There is no common solution to provide efficient Radio Bearer (RB) level service differentiation over a Transport Network bottleneck. In International patent application No. PCT/EP2011/068023, the present inventors have described a mechanism for a per-bearer level service differentiation, that makes the bandwidth sharing among RBs more RAN-controlled. This is described further below in relation to FIG. 1. The mechanism employs the concept of "colour" profiling similar to that defined by the Metro Ethernet Forum (MEF) in MEF 23, Carrier Ethernet Class of Service—Phase 1 (See also http://metroethernetforum.org/PDF_Documents/Bandwidth-Profiles-for-Ethernet-Services.pdf.). As a way of indicating which service frames (or data packets) are deemed to be within or outside of the Service Level Agreement (SLA) contract colours are assigned to the data packets according to the bandwidth profile. Note that there is no technical significance to the colour itself, which is just used as a convenient way of describing and/or labeling the data packets. Levels of compliance are green when fully compliant, yellow when sufficient compliance for transmission but without performance objectives and red or discarded when not compliant with either. The data packets of a bearer are checked against the compliance requirements by a bandwidth profiler, for example a two-rate, three-color marker. This validation process can be used between two parties (e.g. between two operators) and can be the part of the SLA. In general, in the SLA different requirements are set for green packets and yellow packets. The green packets are "more important" than the yellow packets. To reflect this difference between two types of packets, at a bottleneck point such as on entry to a TN, a colour aware active queue management discards yellow packets in preference to green packets when there is congestion (i.e. insufficient bandwidth available in the TN to transport all data packets). Thus, for each RB a predefined profiling rate (i.e. green rate) is assigned based on the Quality QoS Class Identifier (QCI) of the RB. This mechanism allows bandwidth guarantees to be provided for the RBs, at least to a certain degree.

Referring to FIG. 1, this shows a schematic illustration of a TN employing bandwidth profiling for each of two bearers. The example is shown of an LTE system with two bearers 102, 104 each carrying data packets between a PDN-GW 106 and an eNodeB 108 via a S-GW 110 and through a TN 112. The Bearers 102, 104 are designated S5/S8 bearers 102a, 104a between the PDN-GW 106 and the S-GW 110, S1 bearers 102b, 104b from the S-GW 110 over the TN 112, and radio bearers 102c, 104c beyond the eNodeB 108. Each Bearer is assigned a bandwidth profiler—profiler 114 for bearer 102 and profiler 116 for bearer 104. Each of the bearers has an assigned QCI and an associated predefined 'green' rate (CIR) and bucket size. This example is of a single rate, two-colour profiler, in which data packets that are conformant with the green rate are designated as green packets, and packets that are not conformant are designated as yellow. It will be appreciated that the principles applied to the two-colour profilers described herein could readily be extended to three or more colours, in which case an additional rate would be specified (referred to as an Extended Information Rate—EIR) for each additional colour used.

Packets of each Bearer 102, 104 that conform with the bearer's profiler 114, 116 are marked as conformant packets 118 (i.e. assigned 'green') and packets that do not conform are marked as non-conformant packets 120 (i.e. assigned 'yellow'). Because there are no 'yellow' rates assigned, all data packets that are not coloured 'green' by the profilers 114, 116 are assigned 'yellow'. For example, assume that the 'green rate' is 5 Mbps for a Bearer and the bitrate of this Bearer is about 7.5 Mbps. In this case, approximately ⅓ of the packets of the Bearer will be assigned to 'yellow'.

The TN 112 bottleneck active queue management can then use the colour information marked in the data packets when choosing which packets to drop when there is insufficient bandwidth (congestion). The first packets to be dropped will be the 'yellow' packets 120.

In the example described, a two-colour (green-yellow) profiler is used for each Bearer. The bucket size and 'green' rate at which rate the green tokens arrive into the buckets for each of the Bearers are set by the operator. When the profiler 114, 116 assigns a Packet either 'green' or 'yellow', this means that the packet is marked with the conformance information in such a way it can be used at the TN bottleneck buffer(s). For example the Drop Eligibility (DEI) bit of the packet's Ethernet frame, or the Differentiated Services Control Point (DSCP) field in the IP header could be used to indicate if a packet has been assigned 'green' or 'yellow'.

Originally the colouring concept is used to specify service between two networks/operators. For example in the Service Level Agreement between the two operators they specify the Committed Information Rate (CIR or green rate) and the Excess Information Rate (EIR rate that is the maximum acceptable rate). Roughly speaking the service for green packets are guaranteed and service for yellow packets are only "best-effort" type. This means that the drop of yellow packets does not violate the SLA.

This colouring concept can also be used for improving per-service or per-bearer fairness at a bottleneck, as described in PCT/EP2011/068023. The colouring concept is used in a different way for a different purpose and at a different location (i.e. it is done in the RAN node instead of in the Mobile Back Haul, MBH, node). A green rate is assigned for a bearer (i.e. for a service of a user and roughly speaking a desired bitrate for that service) and data packets of the bearer that do not exceed this bitrate are coloured green, whereas data packets above the green rate are coloured yellow. In this case when a bearer has yellow packets that means that it has a higher bandwidth than the desired value (but gains from this higher bandwidth when the data packets are transported through the bottleneck), so the drop of these yellow packets probably does not have a serious negative impact on the service performance. Consequently, in this case the use of green and yellow packets improves the fairness of resource sharing among user services. Note that when the colouring concept is used for improving per-bearer fairness, then the colouring (i.e. profiling) is done in the RAN node where per-bearer handling is available.

In the above example, a static green rate configuration is used such that the profiler for each bearer uses a predefined green rate. The mechanism is implemented in a RAN node (e.g. Radio Network Controller, RNC, or Serving gateway, S-GW) and operates on a per-bearer basis. For example, if we would like to provide 1 Mbps bandwidth for a specific bearer, then we use a profiler for that bearer with 1 Mbps green rate. A packet of the bearer will be coloured according to this, such that when the bearer bitrate is below 1 Mbps all packets of the bearer will be coloured to green. When the bitrate is over 1 Mbps some packets will be coloured to yellow. At the transport network (TN) an Active Queue manager (AQM) uses colour aware dropping such that when there is insufficient capacity in the TN a yellow packet will be dropped first. This means that bearers that have yellow packets (i.e. their bitrate is above 1 Mbps) will suffer packet drops when there is congestion in the TN.

This static green rate setting can be used for a bearer (i.e. service) where the bandwidth requirement is known in advance—for example a streaming service. However, a relative service differentiation can be useful. For example to differentiate between a premium and a normal Internet access, then a premium user may get, say, 4 times more bandwidth than a normal user. In a High-Speed Downlink Packet Access (HSDPA) network this type of service differentiation is referred to as a Relative Bitrate (RBR) feature. As an option the static green rate setting can be used to approximate relative service differentiation. The static profiling rates for the bearers can be determined based on the typical TN link capacity and the typical traffic mix. When more colours are used, more link capacity and/or traffic mixes can be supported (e.g. with 3 colours 2 traffic mixes can be handled). However, the use of static green rates cannot provide relative service differentiation in all situations. In particular, a static profiling rate mechanism can only handle bottleneck capacity changes in per-bearer resource sharing to a limited extent by using more colours. Also, a static profiling rate mechanism cannot handle all traffic mixes in per-bearer resource sharing. This means that the existing mechanisms do not provide very efficient relative service differentiation.

SUMMARY

A first aspect provides a method of transporting data packets over a telecommunications transport network. The data packets are carried by a plurality of bearers, the bearers each carrying data packets that relate to different ones of a plurality of services. In the method, for each bearer independently of the other bearers, bandwidth profiling is applied to the data packets of the bearer to identify and mark the data packets of each of the bearers that are conformant with a determined maximum information rate for the bearer. The data packets are forwarded for transport through the transport network. If there is insufficient bandwidth available in the transport network to transport all data packets, data packets not identified by the profiling as being conformant are discarded, so as not to be transported through the transport network. The data packets of the bearer transported through the transport network are monitored to determine whether there has been any loss of data packets that should have been transported through the transport network, indicating congestion in the transport network. The maximum information rate of the bearer is adjusted based on the monitoring.

A second aspect provides a network entity of a telecommunications network that provides data packets for transport through a transport network. The data packets are carried by a plurality of bearers, the bearers each carrying data packets that relate to different ones of a plurality of services. The network entity is configured to apply bandwidth profiling to the data packets of one or more of the bearers, independently of the other bearers, to identify data packets that are conformant with a maximum information rate for the bearer. The network entity is configured to forward the data packets to the transport network, including an indication in each of the data packets as to whether it is a conformant data packet or is a non-conformant data packet. The network entity comprises a maximum information rate calculation module configured to adjust the maximum information rate for the bearer based on a feedback signal indicating whether or not there is congestion in the transport network.

A third aspect provides a network entity of a telecommunications network that receives data packets transported over a transport network. The data packets are carried by a plurality of bearers, the bearers each carrying data packets that relate to different ones of a plurality of services. The network entity is configured to monitor the data packets of a bearer transported through the transport network to determine if there has been any loss of data packets that should have been transported through the transport network, and if there has to provide a feedback signal indicating congestion in the transport network.

Embodiments provide a mechanism to update per-RB-level profiling parameters dynamically. Each RB has its own profiling (i.e. green) rate calculation process. The mechanism includes detection of congestion at the TN/bottleneck, for example by detecting if any green packets are having to be dropped. The dropping of green packets is an indication that there are too many green packets for the bottleneck and that the green rate(s) are too high. The mechanism also includes a re-calculation of the green rate for each of the bearers. In some embodiments, when congestion is detected, then the green rate is decreased (resulting in more yellow packets), otherwise the green rate is gradually increased, e.g. according to an AIMD mechanism. The TN node that is a potential bottleneck has to support the colour-aware packet drop mechanism.

DETAILED DESCRIPTION

The embodiments described herein apply per-Bearer bandwidth profiling to control resource sharing among Bearers carrying different services. The embodiments employ a 'colour' profiling scheme of the type described above.

Figure 1:
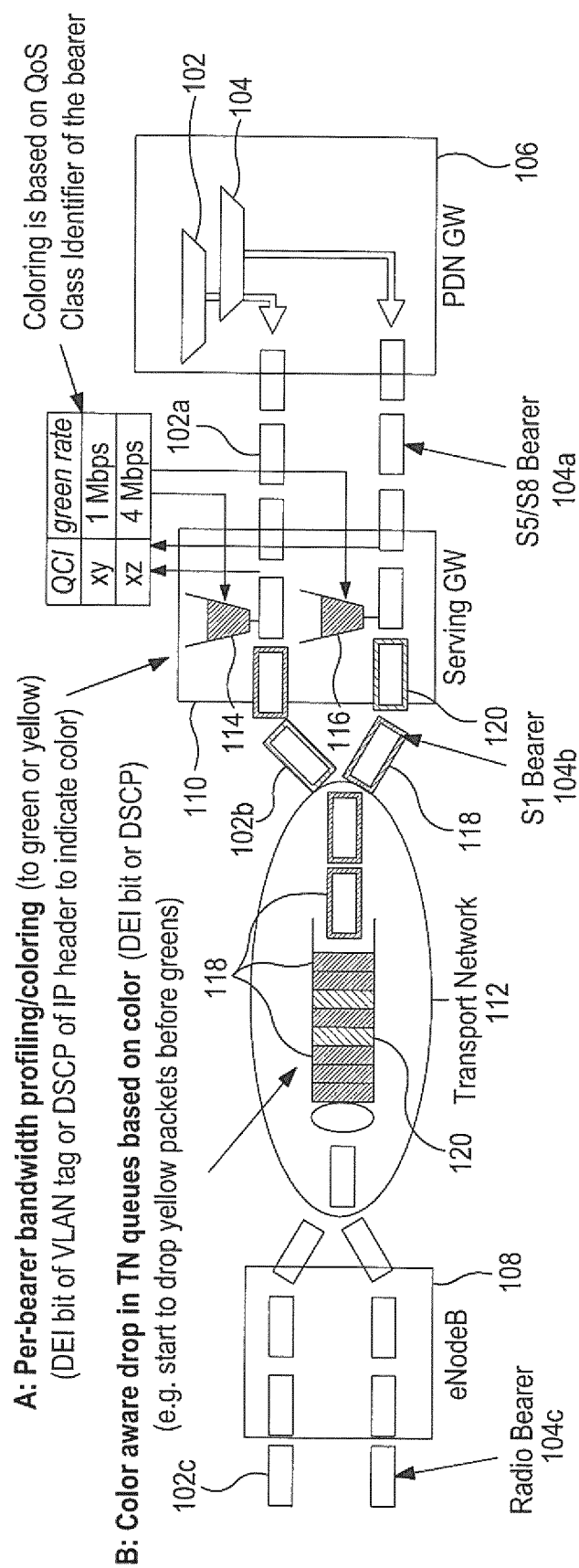
FIG. 1 is a schematic illustration of a TN employing a known per-bearer bandwidth profiling mechanism.
Figure 2:
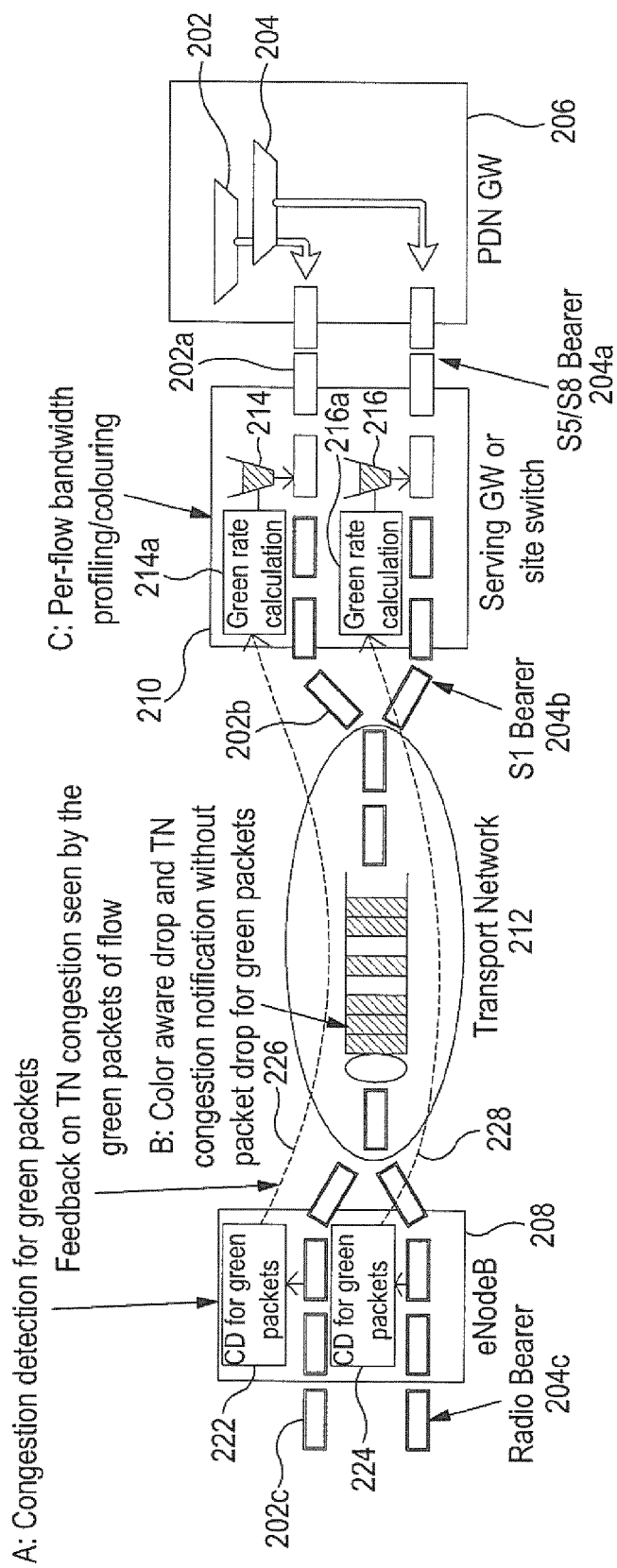
FIG. 2 is a schematic illustration of a TN employing an improved, feedback-based per-bearer bandwidth profiling mechanism

FIG. 2 is a schematic illustration of a TN 212 employing bandwidth profiling for each of two bearers, similar to that shown in FIG. 1. The example is of an LTE system with two bearers 202, 204 each carrying data packets between a PDN-GW 206 and an eNodeB 208 via a S-GW 210 and through the TN 212. As in FIG. 1, the bearers 202, 204 are designated S5/S8 bearers 202a, 204a between the PDN-GW 206 and the S-GW 210, S1 bearers 202b, 204b from the S-GW 210 over the TN 212, and radio bearers 202c, 204c beyond the eNodeB 208. Each Bearer is assigned a bandwidth profiler—profiler 214 for bearer 202 and profiler 216 for bearer 204. Each of the bearers also has a 'green' rate (CIR) calculation module 214a, 216a associated with the respective profiler 214, 216. In this example, as in FIG. 1, there is no 'yellow' rate for the bearers.

Packets of each Bearer 202, 204 that conform with the green rate in the bearer's profiler 214, 216 are marked as conformant packets 218 (i.e. assigned and marked as 'green') and packets that do not conform are marked as non-conformant packets 220 (i.e. assigned and marked as 'yellow'). Because there are no 'yellow' rates assigned, all data packets that are not coloured 'green' by the profilers 214, 216 are assigned 'yellow'. The profilers may use the Drop Eligibility (DEI) bit of the packet's Ethernet frame, or the Differentiated Services Control Point (DSCP) field in the IP header could be used to mark the packet's colour as 'green' or 'yellow'.

The TN 212 bottleneck active queue management can then use the colour information marked in the data packets by choosing to drop yellow packets first when there is insufficient bandwidth (congestion).

In addition, as shown in FIG. 2, at the eNodeB 208 there is a congestion detector 222, 224 for each of the bearers 202c, 204c. The congestion detector 222, 224 of each bearer detects if any green packets are missing. There are a number of ways that the congestion detectors 222, 224 could do this. For example, one potential congestion detection mechanism is to use the sequence numbers of the green packets of each bearer (i.e. not for all packets, only for green packets) such that a gap in the sequence numbers of the green packets received from the TN in the eNodeB 208 indicate that a green packet has been dropped due to congestion. The sequence numbers of the green data packets form part of the header in GPRS Transport Protocol for the User plane (GTP-U). In LTE networks GTP is used between the eNodeB and Serving GW, as well as between the Serving GW and the PDN GW. Transmission Control Protocol (TCP) headers of TCP frames carried by IP data packets. By monitoring the sequence numbers of the data packets arriving over the TN, the congestion detectors 222, 224 at the eNodeB can detect TN congestion if there is a gap in the sequence numbers. In this case there is no need for any further support from, or modification to, the TN node for feedback based profiling.

Another possibility is to use an Explicit Congestion Notification (ECN) based congestion detection mechanism, where the queue management at the TN bottleneck sets an ECN field of the green packets (e.g. according to a Random Early Detection, RED, algorithm). The ECN field is set for the green packets before dropping of any green packets so as to notify the eNodeB about congestion. There are two ways this can be done.

Firstly, using a colour aware Random Early Detection (RED) profile, in which there are separate RED profiles for yellow and green packets, respectively. RED is used to avoid buffer overflow in (transport) nodes. Briefly, the essence of the mechanism is to start to drop incoming packets before the profiler buffer is full. A RED profile is set by specifying a time range (e.g. 100-200 ms) for yellow packets, which means that if the yellow packets delays (time waiting in the buffer) are 100-200 ms then the incoming yellow packets start to be dropped. A larger time range (say 200-300 ms) is set for green packets, so they will start to be dropped if the buffer is almost full. This way green packets carry an ECN marking whereas yellow packets are dropped at the TN bottleneck. Of course, a yellow packet will always be dropped if possible instead of dropping a green packet.

The second option is to use an aggregated measurement based ECN setting for green packets. This requires an additional functionality in the TN node. The node measures the fraction of green packets in the traffic (e.g. the number of bytes of the green packets divided by the total number of bytes of all packets) and averages this over, say, a 1 sec time interval. If this fraction is above, say, 90% then a switch sets the ECN field of each green packet to inform the eNodeB that there is congestion.

As shown by the broken line arrows 226, 228 in FIG. 2, the output of the congestion detectors 222, 224 of each bearer is signalled back to the S-GW 210 where the per-bearer profiling is done in a feedback signal. Any appropriate signalling mechanism may be used, for example a GPRS Tunnelling Protocol such as GTP-U control protocol, or for HSDPA systems an Iub FP (Frame Protocol for the UTRAN Iub interface) control frame. A prohibit timer may be used to control the timing of the congestion signalling and prevent congestion signals being sent to the profilers 214, 216 too frequently.

As shown in FIG. 2, each bearer 202, 204 has its own green rate calculation module 214a, 216a associated with the respective bearer profiler 214, 216 at which the data packet profiling is done based on the actual green rate provided by the green rate calculation module 214a, 216a. The green rate calculation modules 214a, 216a are also located in the S-GW 210 (or for an HSDPA system would be in the RNC). The green rate calculation modules use the congestion information fed back (as shown by arrows 226, 228, from the congestion detection modules 222, 224). In some embodiments the green rate is regularly updated (e.g. every 100 ms) by the green rate calculation modules 214a, 216a according to a specified procedure or algorithm. For example, an Additive Increase/Multiplicative Decrease (AIMD) mechanism could be used, wherein: if a feedback signal indicates congestion then the green rate is reduced multiplicatively (e.g. to 90% of its value); and if there is no congestion indicated by a feedback signal then green rate is increased additively (e.g. with 100 kbps). Note that in some embodiments feedback signals may be sent regularly, either indicating congestion or no congestion, whereas in other embodiments a feedback signal may be sent only if congestion is detected. Other mechanisms than AIMD could also be used. In some embodiments a bitrate reduction could be done immediately at the reception of a feedback signal indicating congestion, while a bitrate increase is done regularly (in the absence of any feedback signal indicating congestion). At each change, the green rate of the bandwidth profiler is updated.

Note that the TN bottleneck Active Queue Manager (AQM) has to support colour aware packet dropping. This means that when there is congestion, first yellow packets have to be dropped, and only if there are no longer any yellow packets in the queue does the AQM drop a green packet.

Figure 3:
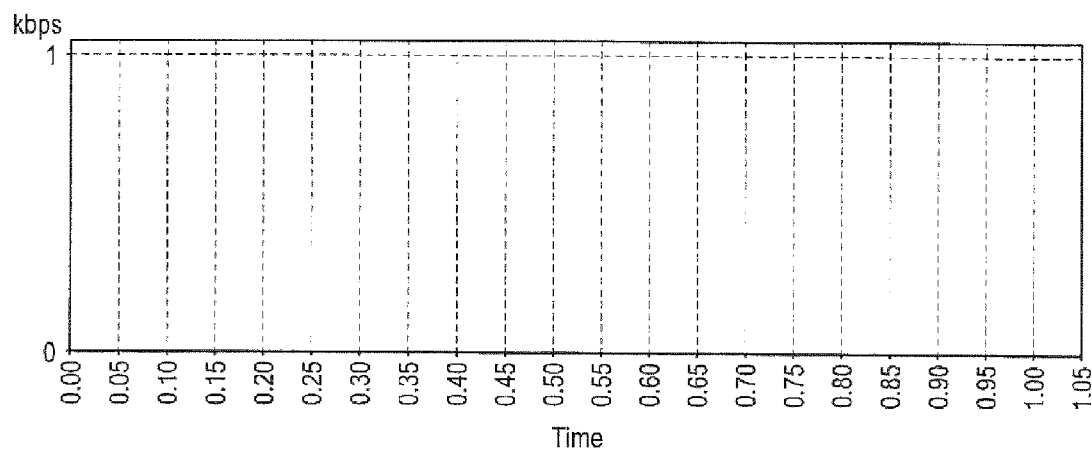
FIGS. 3 to 5 illustrate the results of a computer simulation of feedback-based per-bearer bandwidth profiling.
Figure 3:
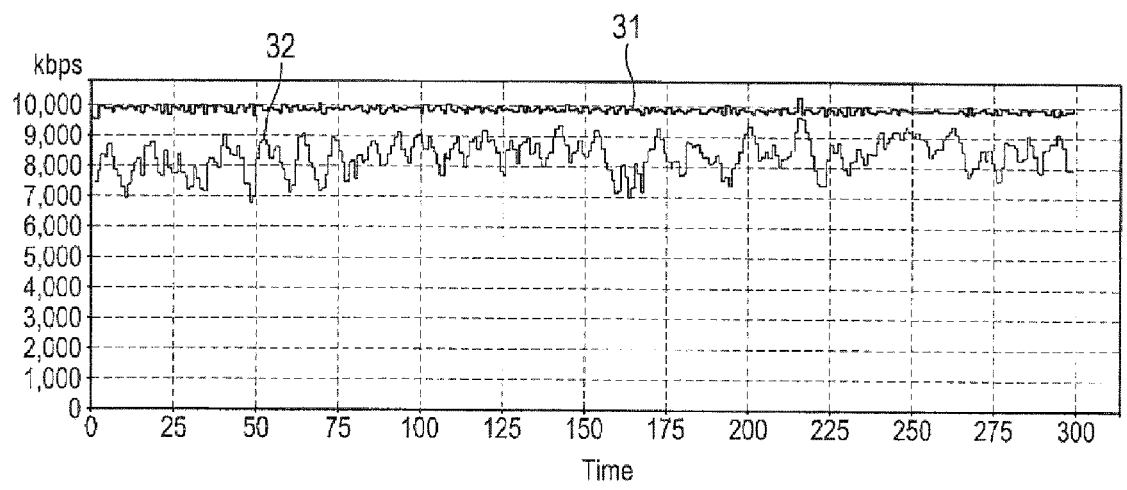
Figure 4:
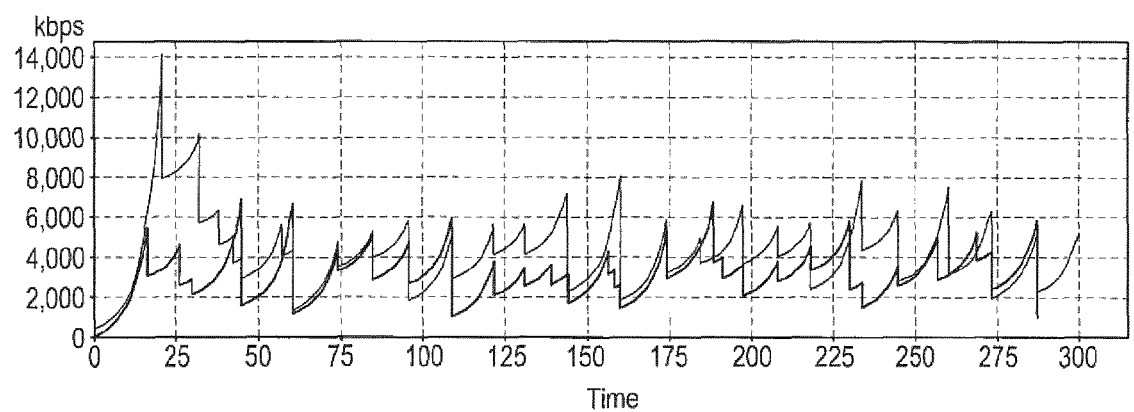
Figure 4:
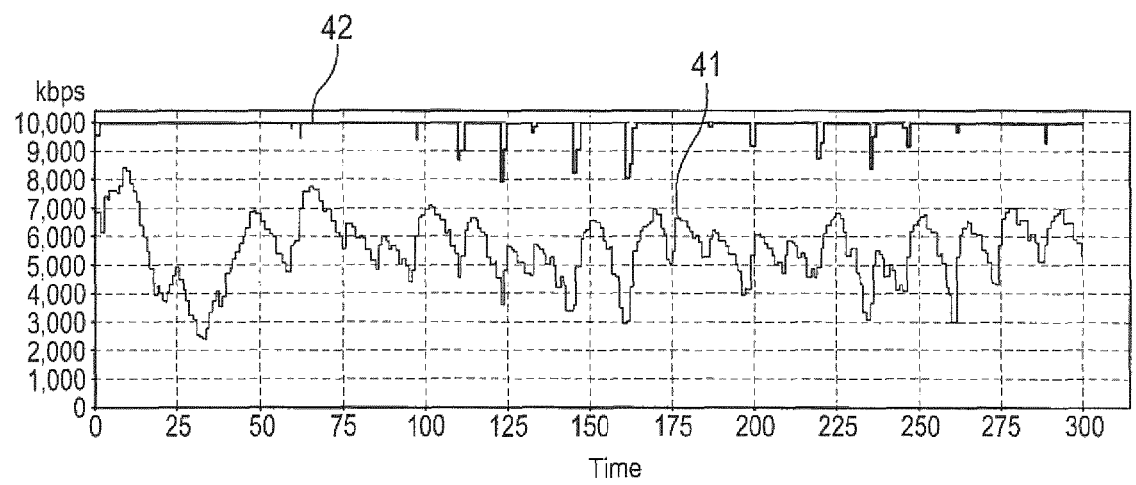
Figure 5:
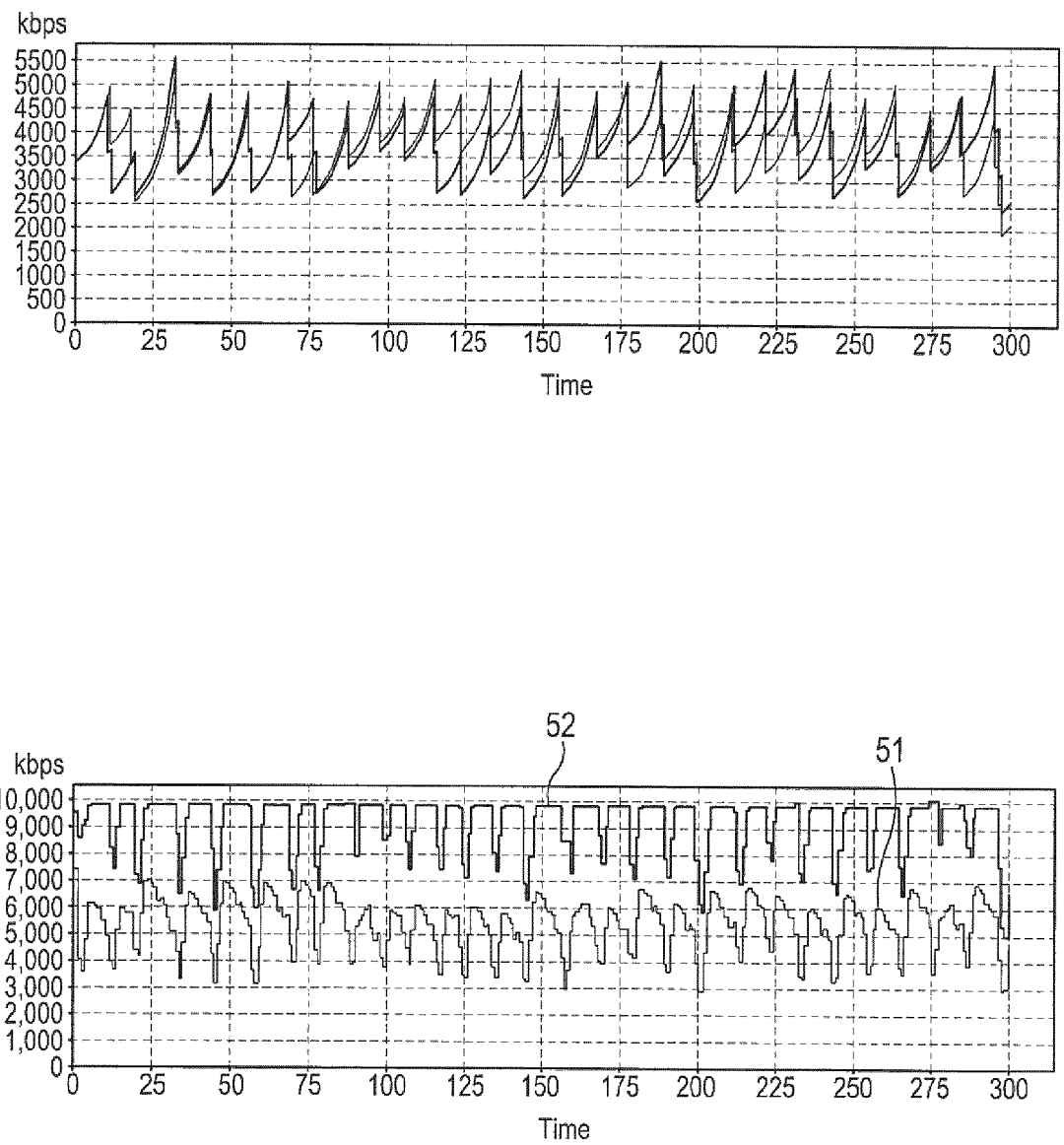

FIGS. 3-5 illustrate the results of simulations in which the above-described feedback based bandwidth profiling has been applied. The top graph in each figure illustrates the feedback signals from the TN, while the bottom graph illustrates the actual bandwidths of the user traffic flows. The simulations are for a TN having a 10 Mbps capacity and applying an AQM using RED dropping of packets with a RED profile of 100-300 ms. Per-bearer bandwidth profiling is applied with a 100 ms buffer time for each bearer, a profiler bucket size of 500 kbytes, an initial green rate for each bearer of 50 kbps, and an AIMD scheme. The AIMD scheme uses an increase rate of ×1.02 per 100 ms, meaning that the bitrate is increased additively, but the amount added is also increased by this factor for each consecutive increase. After a decrease, the increase rate is reset to the initial value. The decrease factor is 0.75. Two users are simulated, one an aggressive user with 5 parallel TCP flows and the other with a single TCP flow.

The top graph in each figure illustrates the feedback signals from the TN for each user's aggregated traffic, while the bottom graph illustrates the aggregated TN throughput of each user. FIG. 3 is the reference case with no feedback. Line 31 is the 5-flow user's throughput and line 32 is the single-flow user's throughput. As can be seen the aggressive 5-flow user dominates such that the throughput of the single-flow user is adversely affected. FIG. 4 shows the corresponding situation with congestion feedback based on gaps in the sequence numbers of the green data packets of each user. Line 41 is the 5-flow user's throughput and line 32 is the single-flow user's throughput. As the graph shows the congestion results in the flows of the aggressive 5-flow user being reduced, bit the single flow user is largely unaffected. FIG. 5 shows a similar result, this time using an ECN-based congestion detection for the feedback signals. Line 51 is the 5-flow user's throughput and line 52 is the single-flow user's throughput.

Figure 6:
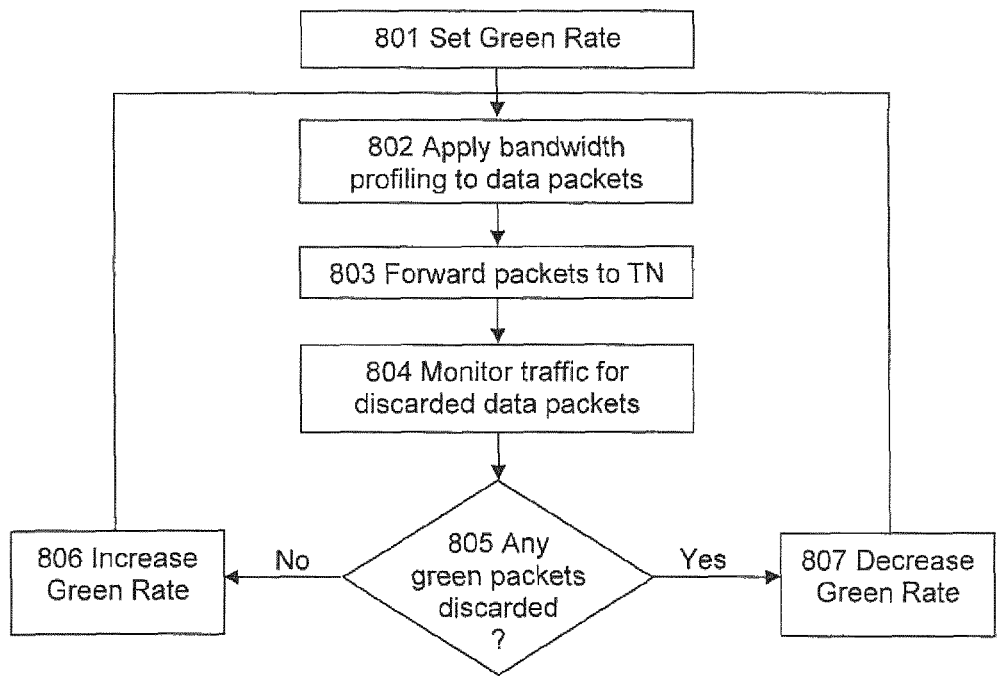
FIG. 6 is a flow diagram illustrating the principal steps in a method of feedback-based per-bearer bandwidth profiling.

FIG. 6 is a flow diagram illustrating the method for applying the feedback-based profiling of the data packets of a bearer. At step 801 a green rate has been set for the bearer, and at step 802 bandwidth (colour) profiling is applied to the data packets of the bearer prior to them being forwarded to the TN bottleneck. At this stage the data packets are marked (as green or yellow) depending on whether they are conformant with the set green rate for the bearer. At step 803 the data packets are forwarded to the TN. If there is insufficient bandwidth available in the TN to transport all data packets, yellow data packets are discarded first before any green packets. At step 804, the data packets transported through the transport network are monitored and at step 805 a determination is made as to whether there has been any loss of green data packets, indicating congestion in the TN. After the determination has been made at step 805, the information is fed back to the green rate adjuster at the profiler, where the green rate of the bearer is adjusted. If at step 805 it was determined that no green packets have been discarded, then the method proceeds to step 806, where the green rate is increased. However, if at step 805 it was determined that green packets have been discarded, then the method proceeds to step 807 where the green rate is decreased.

Figure 7A:
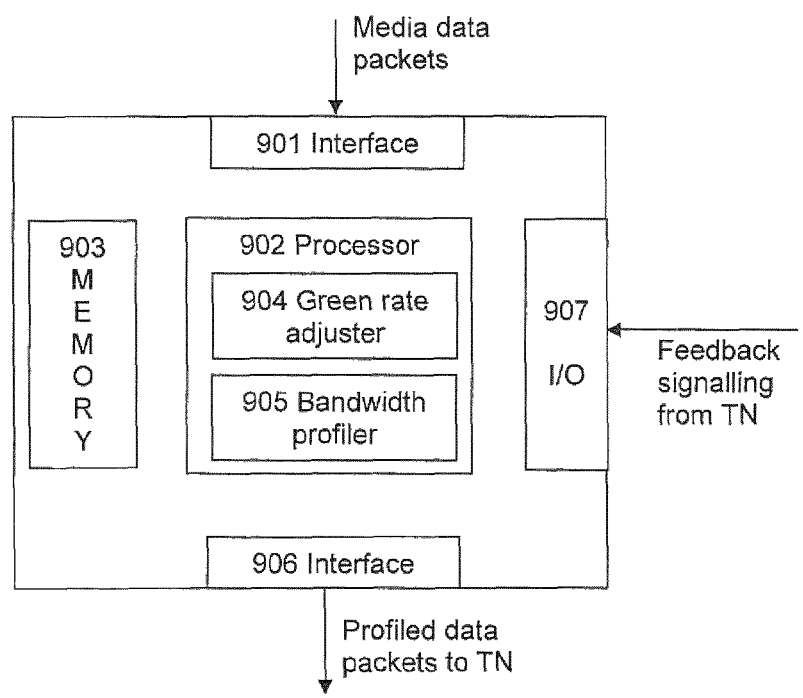
FIG. 7a is a block diagram illustrating functional components in a network entity configured for use of a feedback-based per-bearer bandwidth profiling mechanism.

FIG. 7a illustrates schematically the functional components of a network entity 900 (such as a Serving Gateway, S-GW) configured to apply bandwidth profiling to the data packets of a bearer in accordance with the feedback based profiling mechanism. The entity includes an interface 901 through which media data packets arrive, which are destined to be transported over a TN. The network entity also includes processor 902 and a memory 903 storing data and programming instructions for the processor. The processor 902 includes a green rate adjuster 904 and a bandwidth profiler 905. The network entity 900 also includes a, Input/Output 907 which receives feedback signalling from the TN, and another interface 906 through which media data packets are sent to the TN. The bandwidth profiler 905 is configured to identify data packets that are conformant with a maximum information (green) rate for the bearer, and to forward the data packets to the TN with an indication in each of the data packets as to whether it is a green (conformant) data packet or a yellow (non-conformant) data packet. The green rate adjuster 904 is a calculation module configured to adjust the green rate for the bearer based on feedback signals from the TN indicating whether or not there is congestion in the TN.

Figure 7B:
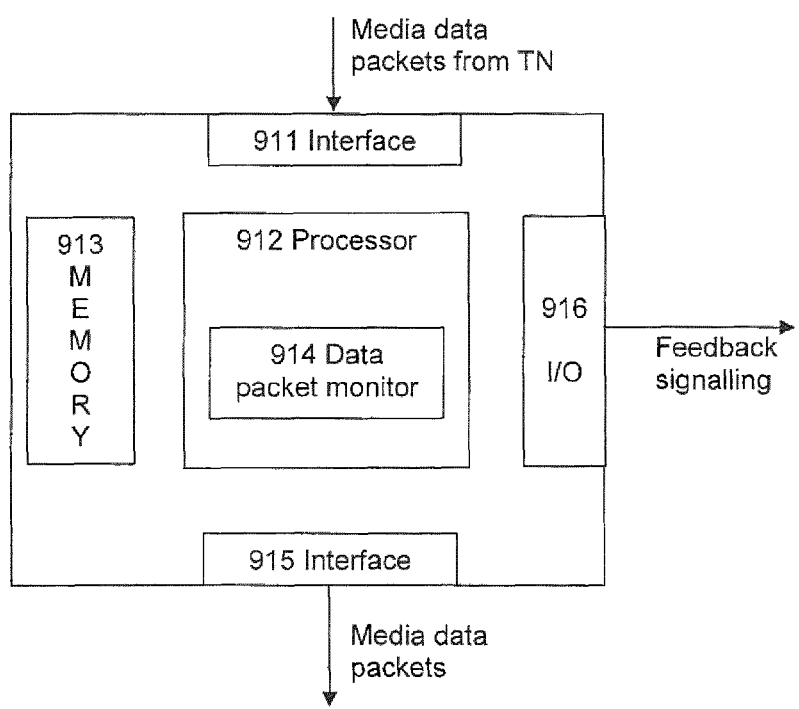
FIG. 7b is a block diagram illustrating functional components in a network entity configured for providing feedback in a feedback-based per-bearer bandwidth profiling mechanism.

FIG. 7b illustrates schematically the functional components of a network entity 910 (such as an eNodeB) configured to provide a feedback signal to a bandwidth profiler in accordance with the feedback based profiling mechanism. The entity includes an interface 911 through which media data packets arrive, which have been transported over a TN. The network entity also includes processor 912 and a memory 913 storing data and programming instructions for the processor. The processor 912 includes a data packet monitor 914. The network entity 900 also includes an Input/Output 916 through which feedback signalling is sent to a profiler, and another interface 915 through which media data packets are delivered towards their final destination. The data packet monitor 914 is configured to monitor the data packets of a bearer transported through the TN to determine if there has been any loss of green data packets that should have been transported through the TN, and if there has, to provide a feedback signal to the profiler of the bearer indicating congestion in the transport network.

The feedback-based profiling mechanisms discussed above allow for variations in the amount of traffic being handled at a TN bottleneck to be taken into account at the profilers so that packet dropping when there is congestion can be shared more fairly among bearers. The mechanism can bee applied to a common TN handling traffic of multiple services from multiple service providers. The green rate recalculation is done on a per-bearer basis allowing the operators control of the rate calculation algorithms applied.

The invention claimed is:

1. A method of transporting data packets over a telecommunications transport network, wherein the data packets are carried by a plurality of bearers, the bearers each carrying data packets that relate to different ones of a plurality of services, the method comprising, for each bearer independently of the other bearers:
   applying bandwidth profiling to the data packets of the bearer to identify and mark the data packets of each of the bearers that are conformant with a determined maximum information rate for the bearer;
   forwarding the data packets for transport through the transport network, wherein if there is insufficient bandwidth available in the transport network to transport all data packets, data packets not identified by the profiling as being conformant are discarded, so as not to be transported through the transport network;
   monitoring the data packets of the bearer transported through the transport network to determine whether there has been any loss of conformant data packets, indicating congestion in the transport network; and
   adjusting the maximum information rate of the bearer based on the monitoring.

2. The method of claim 1, wherein the bandwidth profiling includes assigning the conformant data packets of a bearer as 'green' data packets based on the maximum information rate for the bearer and assigning other data packets that are not conformant as 'yellow'.

3. The method of claim 2, wherein applying the bandwidth profiling further comprises adding an indication of the packet 'colour' to a data field in the packet.

4. The method of claim 3, wherein the indication of the packet 'colour' comprises a Drop Eligibility, DEI, bit and/or a Differentiated Services Control Point, DSCP field in an IP header of the packet.

5. The method of claim 1, wherein adjusting the maximum information rate of the bearer comprises updating the maximum information rate based on an additive increase/multiplicative decrease, AIMD, mechanism.

6. The method of claim 5, wherein the maximum information rate is reduced immediately when the monitoring indicates congestion in the transport network, and is increased if no congestion is indicated in a predetermined time interval.

7. The method of claim 1, wherein monitoring the data packets comprises adding sequence numbers to the data packets before they are transported over the transport network and checking the sequence numbers of data packets as they leave the transport network.

8. The method of claim 7, further comprising providing a congestion indication to a maximum information rate calculation module when the monitoring detects a gap in the sequence numbers of the data packets.

9. The method of claim 7, wherein the sequence numbers are added only to data packets that are marked as conformant by the bandwidth profiling.

10. The method of claim 1, further comprising using an Explicit Congestion Notification, ECN, mechanism to provide an indication of congestion in the transport network.

11. The method of claim 10, wherein the ECN mechanism uses a Random Early Detection, RED, algorithm.

12. The method of claim 11, wherein the ECN mechanism is used only on data packets that are marked as conformant by the bandwidth profiling.

13. The method of claim 10, wherein the ECN mechanism is based on a measurement of the proportion of the traffic transported over the transport network that is made up of conformant data packets.

14. A network entity of a telecommunications network that provides data packets for transport through a transport network, wherein the data packets are carried by a plurality of bearers, the bearers each carrying data packets that relate to different ones of a plurality of services, and wherein the network entity comprises:
   one or more packet interfaces configured to receive and forward data packets;
   a communications interface configured to receive feedback signaling; and
   a processing circuit operatively associated the one or more packet interfaces and the communications interface, and configured to:
      apply bandwidth profiling to the data packets of one or more of the bearers, independently of the other bearers, to identify data packets that are conformant with a maximum information rate for the bearer;
      forward the data packets to the transport network including an indication in each of the data packets as to whether it is a conformant data packet or is a non-conformant data packet; and
      adjust the maximum information rate for the bearer based on a feedback signal indicating whether or not there is congestion in the transport network.

15. The network entity of claim 14, wherein the network entity is a Serving Gateway, S-GW, or a Packet Data Network Gateway, PDN-GW in a LTE network.

16. The network entity of claim 14, wherein the network entity is a Radio Network Controller, RNC, or a Gateway GPRS Support Node, GGSN, in a High-Speed Downlink Packet Access, HSDPA, network.

17. A network entity of a telecommunications network that receives data packets transported over a transport network, wherein the data packets are carried by a plurality of bearers, the bearers each carrying data packets that relate to different ones of a plurality of services, and wherein the network entity comprises:
   a packet interface to receive the data packets;
   a communications interface to send feedback signaling; and
   a processing circuit that is operatively associated with the packet interface and the communications interface and configured to:
      monitor the data packets of a bearer transported through the transport network to determine if there has been any loss of conformant data packets, wherein conformant data packets for any given one of the bearers are data packets that conform with a determined maximum information rate for the bearer; and
      use an Explicit Congestion Notification, ECN, mechanism to provide a feedback signal indicating congestion in the transport network, when there has been a loss of conformant data packets, wherein the processing circuit is further configured to measure the proportion of the traffic transported over the transport network that is made up of data packets that have been marked as conformant data packets by a bandwidth profiler as a setting for the ECN mechanism.

18. The network entity of claim 17, wherein the processing circuit is configured to monitor the data packets by checking sequence numbers of the data packets as they are received and to provide the feedback signal when a gap is detected in the sequence numbers.

* * * * *